United States Patent [19]

Haka

[11] Patent Number: 5,577,976
[45] Date of Patent: Nov. 26, 1996

[54] POWER TRANSMISSION

[75] Inventor: Raymond J. Haka, Brighton, Mich.

[73] Assignee: General Motors Corporation, Detroit, Mich.

[21] Appl. No.: 522,006

[22] Filed: Aug. 31, 1995

[51] Int. Cl.$^6$ .................................................. F16H 3/58
[52] U.S. Cl. .................................................. 475/280
[58] Field of Search .................................. 475/280, 313, 475/319, 325

[56] References Cited

U.S. PATENT DOCUMENTS

| 2,631,476 | 3/1953 | Ravigneaux . | |
|---|---|---|---|
| 2,761,333 | 9/1956 | Ravigneaux . | |
| 4,658,672 | 4/1987 | Michael ................................ | 475/280 |
| 5,046,999 | 9/1991 | Liu et al. . | |
| 5,133,697 | 7/1992 | Hattori ................................. | 475/325 |
| 5,326,334 | 7/1994 | Ra et al. ............................... | 475/330 |

Primary Examiner—Dirk Wright
Attorney, Agent, or Firm—Donald F. Scherer

[57] ABSTRACT

A planetary gear arrangement for a multi-speed power transmission has a carrier assembly with a plurality of pinion gear sets wherein each set has one long pinion and three short pinions. The long pinion meshes with two short pinions and a ring gear. The third short pinion meshes with a sun gear and one of the short pinions. The other two short pinions mesh with a ring gear and a sun gear, respectively. The carrier and both sun gears are connected with selectively operable rotating torque transmitters and the carrier, one sun gear and one ring gear are connected with selectively operable stationary torque transmitters while the other ring gear defines an output member for the planetary gear arrangement.

9 Claims, 3 Drawing Sheets

POWER TRANSMISSION

TECHNICAL FIELD

This invention relates to power transmissions, and more particularly, to power transmissions incorporating multi-speed planetary gear arrangements.

BACKGROUND OF THE INVENTION

Planetary gear arrangements utilizing Ravigneaux type gearing, that is, long and short intermeshing pinions, have a design limitation in that the ring gear meshing with the long pinion must be significantly smaller than the other ring gear and also that the sun gear axially aligned with the smaller ring gear must be significantly smaller than the other sun gear. The difference in size of the ring gears and sun gears is necessary to eliminate the problem of the tips of the gear teeth hitting each other. Such a gear arrangement is shown in U.S. Pat. No. 5,046,999 issued to Liu et al., Sep. 10, 1991.

To overcome this limitation, it has been proposed to use a stepped diameter pinion as the long pinion gear and/or place the ring gear mesh axially outboard the sun gear mesh, as shown in U.S. Pat. No. 2,631,476 issued to Ravigneaux or U.S. Pat. No. 2,761,333 also issued to Ravigneaux.

SUMMARY OF THE INVENTION

The gear arrangement of the present invention overcomes the size limitation of the sun gears and ring gears by incorporating an additional pinion gear within the planetary arrangement. While this increases the number of pinion gears utilized, the additional cost can be minimized by having the short axial pinion gears all being same size and with the same number of teeth.

With the present invention, the long pinion meshes with one ring gear and two of the shorter pinions. One of the shorter pinions meshes with a sun gear axially aligned with a ring gear and the other pinion meshes with a ring gear and with a short pinion meshing with the other sun gear. By utilizing this arrangement, the sun gears can be made of considerably different sizes including a combination wherein the sun gear aligned with the small diameter ring gear can be the largest of the sun gears within the system. The sun gear diameters can be adjusted, such that the sun gears can be of equal diameter or either of the sun gears may have a larger diameter than the other. Similarly, the ring gear diameters can be adjusted such that the ring gears can be of equal diameter or either ring may have the larger diameter of the two. This greatly increases the number of planetary ratios available with this design of gear intermeshing.

It is therefore an object of this invention to provide an improved planetary gear arrangement, wherein four intermeshing planetaries provide a Ravigneaux type gear arrangement without a restriction on the relative size of the sun gears.

One aspect of this invention can be seen in that the axially aligned sun and ring gears which mesh with the long pinion can incorporate a large diameter sun gear compared with the other sun gear within the planetary gear set.

DESCRIPTION OF AN EXEMPLARY EMBODIMENT

Figure 1:
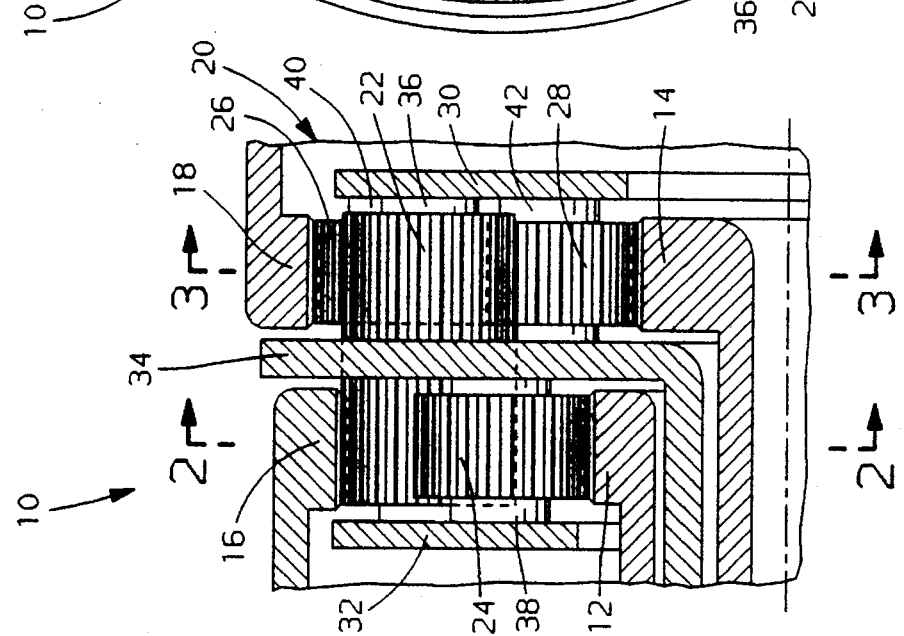
FIG. 1 is an elevational view of a planetary gear arrangement incorporating the present invention and is taken along line 1—1 of FIG. 2.
Figure 2:
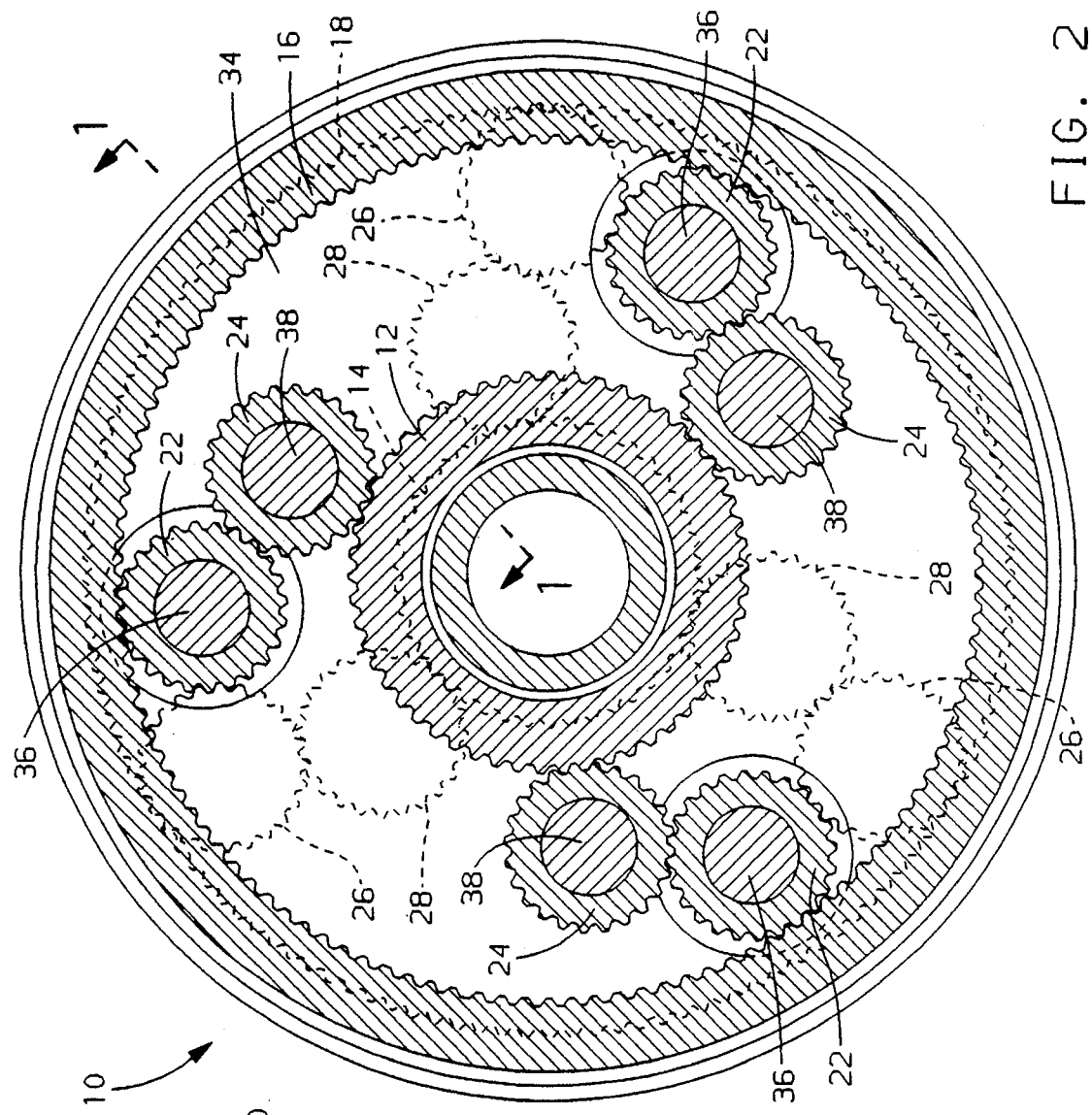
FIG. 2 is an axial sectional view of the planetary gear arrangement taken along line 2—2 of FIG. 1.
Figure 3:
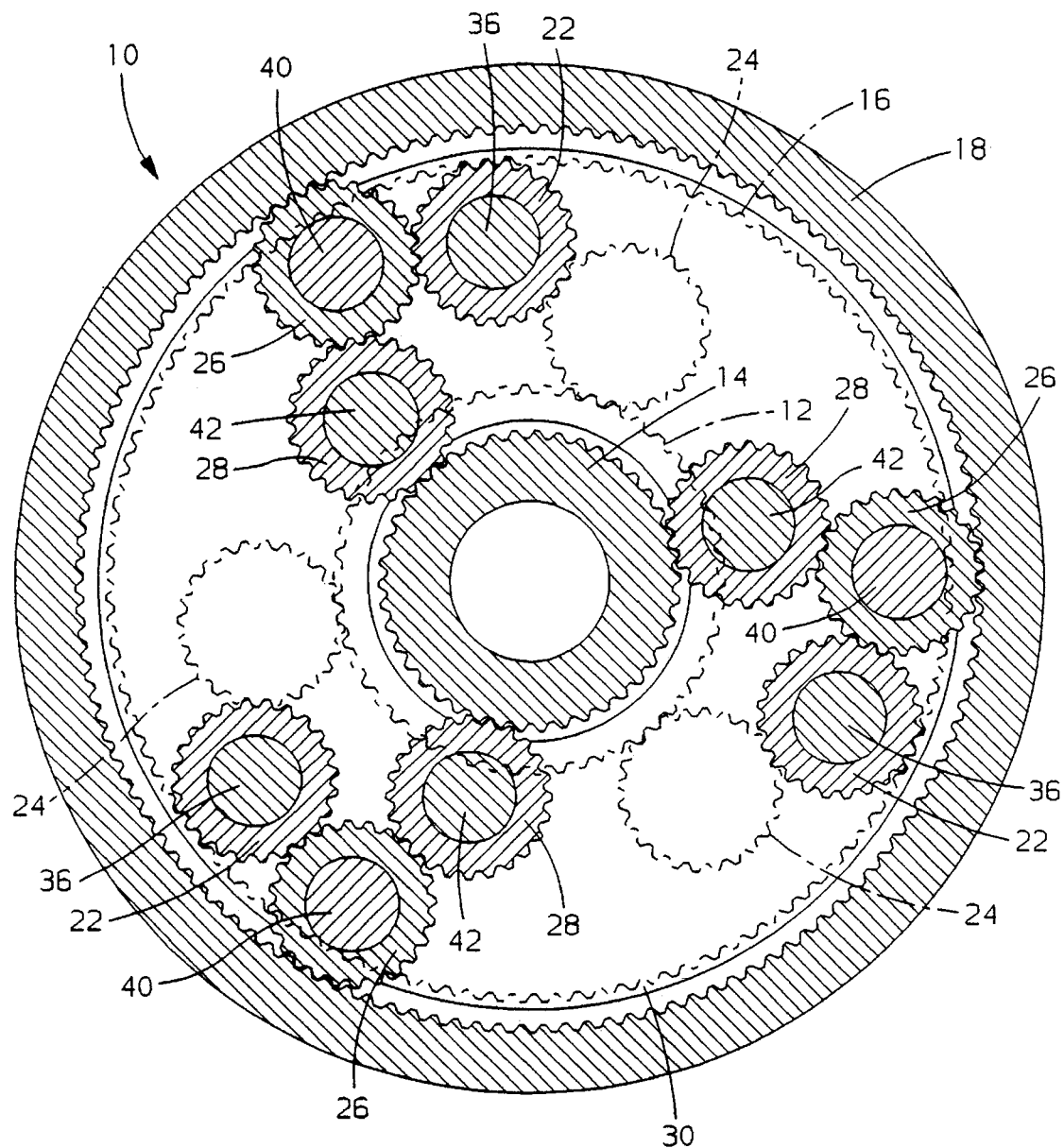
FIG. 3 is a view similar to FIG. 2 taken along line 3—3 of FIG. 1.

As best seen in FIGS. 1 through 3, the present invention incorporates a planetary gear arrangement 10 having a pair of axially spaced sun gears 12 and 14, a pair of ring gears 16 and 18 axially aligned with sun gears 12 and 14, respectively, and a planet carrier assembly 20. The planet carrier assembly 20 includes long pinion gears 22 which mesh with the ring gear 16, short pinion gears 24 which mesh with the pinions 22 and sun gear 12, and short pinion gears 26 which mesh with the ring gear 18 and the pinion gears 22, and further pinion gears 28 which mesh with the pinions 26 and the sun gear 14.

The carrier assembly 20 also includes a pair of end plates 30 and 32 and a central plate 34. The pinion gears 22 are rotatably supported on pins 36 which extend between the end plates 30 and 32, the pinions 24 are rotatably supported on pins 38 which extend between plate 32 and central plate 34, and the pinions 26 and 28 are rotatably supported on pins 40 and 42, respectively, which are supported in the plate 30 and central plate 34.

As best seen in FIGS. 2 and 3, there are a total of three sets of four pinions each, making a total of twelve pinion gears. Preferably, the pinions gears 24, 26 and 28 would be substantially the same diameter and therefore have the same number of teeth, reducing the manufacturing and inventory complexity that might otherwise be associated with the multiple number of pinions. By maintaining the axial space between the plates 30 and 34 and 32 and 34 to be equal, the pins 38, 40 and 42 can also be produced to be identical, thereby reducing the manufacturing costs that might otherwise be associated with producing a large number of pins.

Figure 4:
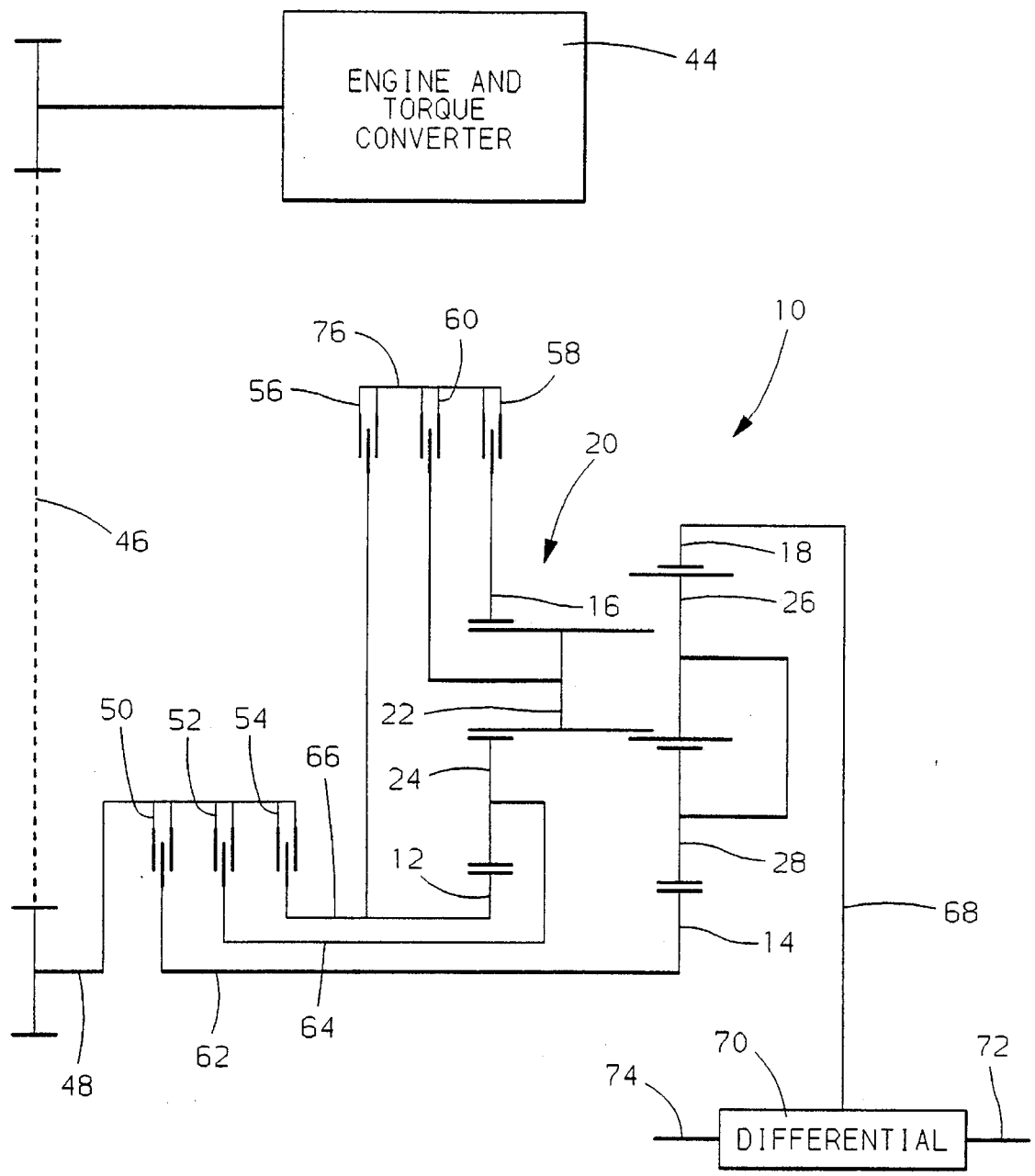
FIG. 4 is a schematic representation of the planetary arrangement described in FIGS. 1 through 3 and incorporating an engine torque converter differential and various friction devices.

In FIG. 4, there is seen a schematic representation of the planetary arrangement 10 which incorporates an engine and torque converter assembly 44, drivingly connected through a chain drive mechanism 46 to an input shaft and hub 48. The input shaft and hub 48 incorporates three fluid operated friction clutch members 50, 52 and 54. These members are constructed in accordance with the generally accepted principles of assembly of fluid operated friction clutches which are well known within the transmission art.

The schematic representation in FIG. 4 also includes three fluid operated friction brakes 56, 58 and 60, which are also constructed in accordance with the generally accepted principles of friction brake members. These brake members may be either disc type or band type, both of which are well known within the power transmission art.

The clutch 50 is connected with a shaft 62, which in turn is connected with the sun gear 14. The clutch 52 is connected with a shaft 64 which is connected with the carrier assembly 20. The carrier assembly 20 is also operatively connected with the friction brake 60. The clutch 54 is connected with a shaft 66 which is also connected with the sun gear 12. The sun gear 12 and shaft 66 are also connected with the friction brake 56. The friction brake 58 is connected with the ring gear 16 and the remaining gear member, that is, ring gear 18 is connected through a hub or output member 68 with a conventional differential assembly 70. The differential assembly 70 has a pair of output or drive shafts 72 and 74 which may be connected with vehicle drive wheels, not shown.

The differential assembly 70, engine and torque converter assembly 44 and the chain mechanism 46 are conventional transmission items, the production and assembly of which is well known to those skilled in the art, such that further description is not believed necessary at this point. The clutches 50, 52 and 54 and brakes 56, 58 and 60 are selectively operable in combinations to provide five forward speed ratios and one reverse speed ratio between the engine and torque converter 44 and the differential 70.

To establish the first and lowest of the speed ratios, the clutch 50 and brake 60 are engaged to establish the sun gear 14 as an input member and the carrier 20 as the reaction member. In the alternative to the friction brake 60, a conventional one-way device may be incorporated between the carrier and the stationary portion of the transmission in parallel with the friction brake 60.

To establish the second forward ratio, the brake 60 is disengaged and the brake 56 is engaged. This will maintain the sun gear 14 as the input member, however, the reaction member will be sun gear 12. If desired, a one-way device may be incorporated between the shaft 66 and the friction brake 56, such that a conventional one-way reaction device is provided. If a one-way device is disposed between the carrier assembly 20 and a transmission housing 76, it will automatically overrun when the second ratio is engaged.

The third forward ratio is established by disengaging the friction brake 56 and engaging the clutch 52 resulting in a direct or 1:1 drive in the planetary arrangement 10. This will cause both the planet carrier 20 and the sun gear 14 to be driven by the chain mechanism 46 and the input shaft 48. If a conventional one-way device is incorporated between the friction brake 56 and shaft 66, the one-way device will automatically overrun when the clutch 52 is engaged. The use of one-way devices is well-known to provide smooth upshifting and downshifting of power transmissions without the need for hydraulic timers, such as accumulators, or sophisticated electronic controls.

To establish the fourth forward ratio, the clutch 50 is disengaged while the brake 56 is re-engaged. With this arrangement, the carrier assembly 20 becomes the input member for the transmission and the sun gear 12 becomes a reaction member, such that an overdrive ratio is produced between the input shaft 48 and the output member 68 of ring gear 18.

To establish the fifth and highest forward ratio, the brake 56 is disengaged and the brake 58 is engaged. This maintains the carrier 20 as the input member and establishes the ring gear 16 as the reaction member. This also produces an overdrive ratio between the input 48 and the output 68 of the planetary gear assembly 10. If a one-way device is utilized for second ratio, then a separate brake mechanism must be incorporated for the fourth ratio, since the reaction forces on the sun gear 12 are opposite in second gear as compared to fourth gear. This may also be accomplished with a one-way device, if desired. It is likewise possible to incorporate a one-way device between clutch 50 and the sun gear 14 which will permit overrunning on an upshift from third to fourth gears. If a one-way device is incorporated in clutch 50, then a second positive clutch bypassing the one-way is also incorporated to permit engine braking or coast braking of the vehicle. Such a clutch arrangement is well known and has been proposed in other transmissions.

To establish a reverse drive, the clutch 54 is engaged and the brake 60 is engaged. This establishes the sun gear 12 as an input member and the carrier 20 as a reaction member. A reverse drive is incorporated or produced between the sun gear 12 and the ring gear 18 thereby producing a reversal of drive between the input 48 and the output 68.

The gear or drive ratios that can be accomplished utilizing the planetary arrangement 10 vary considerably depending upon the pitch diameters of the sun gears 12 and 14. For example, it should be appreciated that the sun gear 14 affects the first or second ratios while the sun gear 12 affects the second, fourth and reverse ratios. By manipulating the pitch diameters of the sun gear 12 and 14, the overall ratio of the transmission can be controlled to provide adequate power coverage for the given engine and torque converter combination. Likewise, the pitch diameter of the ring gears 16 and 18 have an effect on the transmission ratio. With the present invention, it is possible to provide a transmission gearing wherein the sun gears have the same pitch diameter; or the ring gears have the same pitch diameter. Also, either sun gear can have a relatively larger pitch diameter independent of the ring gears and either ring gear can have a relatively larger pitch diameter independent of the sun gears. Thus, considerable flexibility in gear ratios is possible in a transmission family. Also, the differential assembly 70 can incorporate a final drive assembly which will further assist in establishing the proper speed ratios between the engine and torque converter 44 and the drive shafts 72 and 74.

Those skilled in the art will appreciate the broad range of gear ratios and overall coverage that can be accomplished with the present invention.

What is claimed is:

1. A planetary power transmission comprising:

a planetary gear set having a first sun gear;

a first ring gear axially aligned with said first sun gear;

a second sun gear;

a second ring axially aligned with said second sun gear;

a planet carrier having a central radially extending web, said first sun gear and ring gear being axially disposed on one of said web and said second sun gear and ring being axially disposed on another side of said web;

a plurality of pinion gear sets each comprising a first pinion gear rotatably mounted on said one side of said web in meshing relation with said first sun gear;

a second pinion gear rotatably mounted on said other side of said web in meshing relation with said second ring gear;

a third pinion gear rotatably mounted on said other side of said web in meshing relationship with said second pinion gear and said second sun gear;

a fourth pinion gear rotatably mounted on said carrier extending to both sides of said web and meshing with said first ring gear and said first pinion gear and said third pinion gear; and a plurality of selectively engageable torque transmitting means for selectively controlling the planetary gear set to establish a plurality of gear ratios between said input shaft and an output shaft of the power transmission.

2. The planetary power transmission defined in claim 1, wherein the sun gears have the same pitch diameters.

3. The planetary power transmission defined in claim 1, wherein the ring gears have the same pitch diameter.

4. The planetary power transmission defined in claim 1, wherein the first sun gear has a pitch diameter greater than the second sun gear and the first ring gear has a pitch diameter less than the second ring gear.

5. The planetary power transmission defined in claim 1, wherein the first sun gear and first ring gear have respective pitch diameters greater than the respective pitch diameters of the second sun gear and the second ring gear.

6. The planetary power transmission defined in claim 2, wherein the first ring gear has a pitch diameter greater than the second ring gear.

7. The planetary power transmission defined in claim 2, wherein the first ring gear has a pitch diameter less than the pitch diameter of the second ring gear.

8. The planetary power transmission defined in claim 3, wherein the first sun gear has a pitch diameter greater than the second sun gear.

9. The planetary power transmission defined in claim 3, wherein the second sun gear has a pitch diameter greater than the first sun gear.

* * * * *